US010266277B2

(12) United States Patent
Rideau et al.

(10) Patent No.: US 10,266,277 B2
(45) Date of Patent: Apr. 23, 2019

(54) METHOD AND SYSTEM FOR OPTIMIZED PRODUCTION OF NON-PROPULSIVE ENERGY

(71) Applicant: MICROTURBO, Toulouse (FR)

(72) Inventors: Jean-Francoise Rideau, Tournefeuille (FR); Stephane Vaillant, Fonbeauzard (FR)

(73) Assignee: SAFRAN POWER UNITS, Toulouse (FR)

( * ) Notice: Subject to any disclaimer, the term of this patent is extended or adjusted under 35 U.S.C. 154(b) by 228 days.

(21) Appl. No.: 15/039,026

(22) PCT Filed: Nov. 25, 2014

(86) PCT No.: PCT/FR2014/053018
§ 371 (c)(1),
(2) Date: May 24, 2016

(87) PCT Pub. No.: WO2015/079155
PCT Pub. Date: Jun. 4, 2015

(65) Prior Publication Data
US 2017/0166320 A1 Jun. 15, 2017

(30) Foreign Application Priority Data
Nov. 27, 2013 (FR) ..................................... 13 61711

(51) Int. Cl.
*B64D 41/00* (2006.01)
*B64D 33/04* (2006.01)
(Continued)

(52) U.S. Cl.
CPC ............. *B64D 41/00* (2013.01); *B64D 33/04* (2013.01); *H01M 8/04014* (2013.01);
(Continued)

(58) Field of Classification Search
CPC .. B64D 41/00; B64D 33/04; B64D 2041/005; H01M 2250/402; H01M 2250/20
See application file for complete search history.

(56) References Cited

U.S. PATENT DOCUMENTS

| 2004/0043276 A1 | 3/2004 | Hoffjann et al. |
| 2007/0172707 A1* | 7/2007 | Hoffjann ........... H01M 8/04014 |
| | | 429/9 |

(Continued)

FOREIGN PATENT DOCUMENTS

| DE | 199 11 018 C1 | 8/2000 |
| FR | 2 902 759 A1 | 12/2007 |

OTHER PUBLICATIONS

Search Report in French Application No. 1361711 dated Sep. 11, 2014, with English translation coversheet. 4 pages.
(Continued)

*Primary Examiner* — Brian M O'Hara
*Assistant Examiner* — Keith L Dixon
(74) *Attorney, Agent, or Firm* — Womble Bond Dickinson (US) LLP

(57) ABSTRACT

The invention relates to a system (2) for generating non-propulsive energy in an aircraft, including: an auxiliary power unit (20) including a gas turbine (21) and a fuel cell (22); a pathway (23) for the intake of outside air into the aircraft; an exhaust pipe (24) of the gas turbine, the system being characterized in that the air intake pathway (23) includes a pipe (230) for cooling the fuel pipe, in that the pipe is in fluid communication with the exhaust pipe (24) of the gas turbine such that the ejection of the gas from the gas turbine into the exhaust pipe causes a suction of the air outside the aircraft into the cooling pipe (230) by Venturi effect. The invention also relates to a method for generating non-propulsive energy.

10 Claims, 1 Drawing Sheet

(51) Int. Cl.
*H01M 8/04014* (2016.01)
*B64D 33/02* (2006.01)
*B64D 13/02* (2006.01)

(52) U.S. Cl.
CPC ...... *B64D 13/02* (2013.01); *B64D 2033/0213* (2013.01); *B64D 2041/005* (2013.01); *H01M 2250/20* (2013.01); *H01M 2250/402* (2013.01); *Y02B 90/12* (2013.01); *Y02T 90/32* (2013.01); *Y02T 90/36* (2013.01)

(56) References Cited

U.S. PATENT DOCUMENTS

| | | | | |
|---|---|---|---|---|
| 2008/0187789 A1* | 8/2008 | Ghezel-Ayagh | ........ | F02C 1/007 429/414 |
| 2008/0196956 A1* | 8/2008 | Koenekamp | ............. | B60K 1/04 180/65.1 |
| 2010/0300661 A1* | 12/2010 | Piesker | ................ | B01F 5/0471 165/111 |
| 2011/0003224 A1* | 1/2011 | Scheibert | .......... | H01M 8/04059 429/434 |
| 2013/0089799 A1* | 4/2013 | Reuber | ................ | B25B 27/302 429/423 |
| 2014/0350824 A1* | 11/2014 | Nakao | ..................... | F02D 29/02 701/112 |
| 2016/0355102 A1* | 12/2016 | Friedrich | ............ | H01M 8/0662 |

OTHER PUBLICATIONS

International Search Report and Written Opinion in PCT/FR2014/053018 dated Apr. 13, 2015, with English translation coversheet. 10 pages.

* cited by examiner

METHOD AND SYSTEM FOR OPTIMIZED PRODUCTION OF NON-PROPULSIVE ENERGY

FIELD OF THE INVENTION

The field of the invention is that of the generation of non-propulsive energy in aircrafts.

PRIOR ART

The production of non-propulsive energy on board an aircraft is currently accomplished either by the main engines, which also generate propulsive energy, or by a secondary generator called an auxiliary power unit and most often designated APU.

An auxiliary power unit can be achieved in different ways.

A first type of auxiliary power unit is known, which consists of a gas turbine. However, the operation of a gas turbine is very dependent on the altitude at which it is operated. Thus, to ensure sufficient generation of non-propulsive energy in flight and on the ground, a gas turbine must be greatly oversized with respect to what is needed on the ground to be able to respond to the power levels required in flight.

Thus for example, the nominal power of a gas turbine sized to operate in flight is comprised between 150 and 1500 kW depending on the type of aircraft, while requirements on the ground in terms of power are limited to 50 to 500 kW.

Another type of auxiliary power unit consists of a fuel cell. A fuel cell has the advantage of exhibiting a power that is independent of altitude, which allows for optimized sizing no matter what the flight phase (from the ground to high altitude).

On the other hand, the thermal management of this component can cause problems: unlike gas turbines which exhaust to the outside the calories produced thanks to the exhaust gases, fuel cells must be equipped with a specific cooling system. The integration of this system can prove extremely complex, because the auxiliary power unit is located in a confined environment which can either be a dedicated chamber installed on board the aircraft, or a compartment thereof.

In flight, the fuel cell can be cooled by a dedicated air intake, but on the ground in hot weather this natural cooling is impossible. The cooling system must be sized for this operating point in hot weather. The fuel cell is also sensitive to cold weather, which makes it necessary to install an additional heating system for the cell prior to starting it in cold weather.

Consequently, the electric ventilation solutions needed for the cooling system, the heating system, the additional mass and volume imposed by the use of a fuel cell make this solution non-performing and uneconomical.

There is therefore a need for a non-propulsive electric generating solution in an aircraft, the thermal management whereof is simplified.

A system for generating power in an aircraft is known from document DE 199 11 018, comprising an auxiliary power unit comprising a gas turbine as well as a fuel cell, the gases generated by the fuel cell supplying the combustion chamber of the gas turbine.

This document does not solve the problems of optimized thermal management of the non-propulsive energy generating system.

PRESENTATION OF THE INVENTION

One goal of the invention is to propose a system and a method for generating non-propulsive energy in an aircraft which has simplified thermal management.

In this respect, the invention has as its object a system for generating non-propulsive energy in an aircraft, comprising:
- an auxiliary power unit, comprising a gas turbine and a fuel cell,
- an intake channel for air from outside the aircraft, and
- an exhaust duct of the gas turbine,
- the system being characterized in that the air intake channel comprises a cooling duct for the fuel cell, in that said duct is in fluid communication with the exhaust duct of the gas turbine so that the ejection of gas coming from the gas turbine into the exhaust duct causes aspiration of air from outside the aircraft into the cooling duct by Venturi effect.

Advantageously but optionally, the system according to the invention can also comprise at least one of the following features:
- the system also comprises a chamber wherein is installed the auxiliary power unit, the cooling duct leading into said chamber and the exhaust duct being in fluid communication with the chamber, the ejection of gas coming from the gas turbine into the exhaust duct causing aspiration of air from the chamber toward the outside of the aircraft through the exhaust duct by Venturi effect, said aspiration in turn causing aspiration of air outside the aircraft into the chamber through the cooling duct.
- the fuel cell is of the proton-exchange membrane cell or solid oxide cell type.
- the fuel cell is of the high temperature proton-exchange membrane cell type, the system being installed in an aircraft of the type comprising a pressurized cabin, the system further comprising an air supply system for the cell, by tapping air from the pressurized cabin.
- the fuel cell and the gas turbine are sized to supply a nominal power comprised between 50 and 500 kW.

The invention also has as its object an aircraft comprising such a system, and a method for generating non-propulsive energy, the method being characterized in that it comprises:
- generation of non-propulsive energy by the gas turbine during a ground operation phase of the aircraft, and
- generation of non-propulsive energy by the fuel cell during a stabilized flight operating phase of the aircraft.

Advantageously but optionally, the method according to the invention can further comprise at least one of the following features:
- the method further comprises combined generation of non-propulsive energy by the gas turbine and by the fuel cell during a takeoff and/or landing phase of the aircraft, the operation of the gas turbine causing cooling of the fuel cell by Venturi effect.
- the method further comprises the detection of thermodynamic operating conditions of the aircraft comprising the speed of the aircraft, the temperature of the air outside the aircraft, and the temperature of the fuel cell, and the triggering of a transition, depending on said conditions, between a combined operating mode of the gas turbine and the fuel cell and an operating mode of the cell alone.
- the method further comprises the operation, respectively of the fuel cell or the gas turbine, in the event of failure of the gas turbine or the fuel cell.

DESCRIPTION OF THE FIGURES

Other features, aims and advantages of the present invention will still be revealed by the description that follows, which is purely illustrative and not limiting, and must be read with reference to the appended figures wherein.

DETAILED DESCRIPTION OF AT LEAST ONE EMBODIMENT

Figure 1:
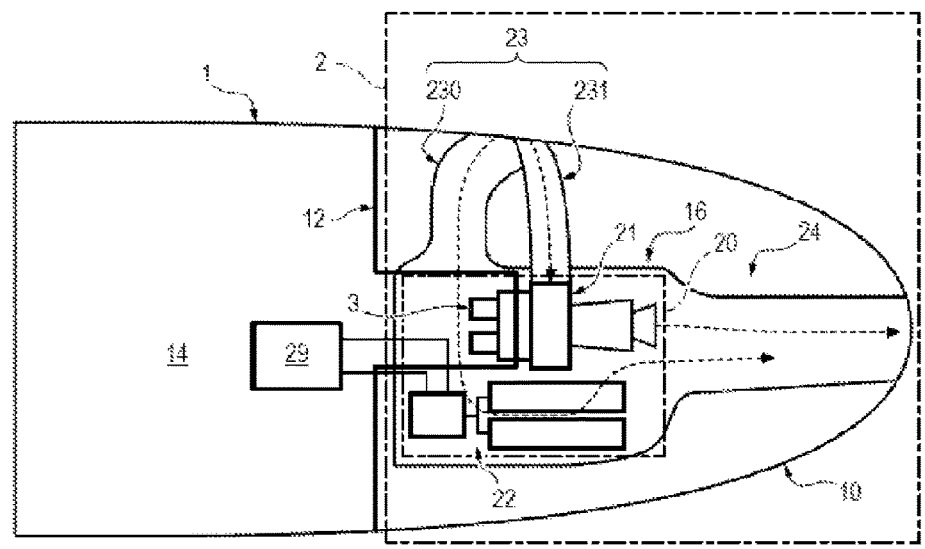
FIG. 1 schematically shows a system allowing the generation of non-propulsive energy.

Referring to FIG. 1, a system for generating non-propulsive energy 2 has been shown schematically.

This system is positioned inside an aircraft 1, of which only the rear cone 10 is shown. The system 2 can for example be positioned directly in the rear cone, in which case a wall 12 called a "firewall" encloses a compartment wherein the system is positioned and is designed to slow the progression of a fire toward the rest of the aircraft.

When appropriate, the aircraft comprises a pressurized cabin 14 positioned on the other side of the firewall 12 with respect to the system.

According to another embodiment, not shown, the aircraft comprises a dedicated chamber 16 wherein the system is positioned. In this case the chamber replaces the firewall.

The non-propulsive energy generating system 2 comprises an auxiliary power unit 20, designed to generate electricity for feeding accessory machinery grouped within an accessory gearbox 3 (AGB), these machines being equipment of the pump, lubricating circuit, starter types, possibly pressurization and heating systems etc. which, even though they are not used for propulsion, are necessary for the operation of the turbine engine and the aircraft.

The auxiliary power unit 20 is composed of a gas turbine 21 and a fuel cell 22.

The fuel cell 22 can be of the high or low temperature proton-exchange membrane type (known under the acronym PEM), or solid oxide fuel cell type (known under the acronym SOFC).

Preferably, air supply to the cell is accomplished with pressurized air coming from the cabin 14. In this case, the fuel cell is preferably but not restrictively selected to be a high-temperature proton-exchange membrane type cell.

To ensure air supply to the cell, the system comprises a system 29 for extracting air from the pressurized cabin, shown schematically in FIG. 1, which can conventionally comprise a compressor to extract a flow of air from the cabin, and an air supply duct for the cell (not shown).

The system 2 also comprises an air intake channel 23 allowing cooling of the fuel cell 22 and air supply to the gas turbine 21, by a duct leading outside the aircraft through an opening provided in the wall of the rear cone.

Preferably, the air intake cone 23 comprises a fuel cell cooling duct 230 and an air supply duct 231 for the gas turbine, these ducts being possibly combined between the auxiliary power unit and the air intake opening.

The system 2 also comprises an exhaust duct 24 of the gas turbine, into which gases ejected by the turbine are emitted and which leads to the outside of the aircraft.

The system 2 is configured so that the operation of the gas turbine allows cooling of the fuel cell by the Venturi effect.

In this regard, the exhaust duct 24 of the gas turbine is in fluid communication with the air intake channel 23, and more precisely with the cooling duct 230 of the fuel cell.

Thus, during operation of the gas turbine, the ejection of gases coming from the turbine into the exhaust duct causes, by aspiration, a flow of air flowing from the environment of the fuel cell to the outside of the aircraft, which causes the aspiration of air coming from outside the aircraft into the duct 230, which makes it possible to cool the turbine. The flow of air in the duct 230 is on the order of 100 to 600 g/s.

According to an advantageous embodiment of the invention, the auxiliary power unit 20 is positioned in a chamber 16 into which leads the cooling duct 230 of the fuel cell, this chamber 16 also being in fluid communication with the air exhaust duct 24.

The chamber 16 makes it possible to reduce the volume in which the auxiliary power unit is located, and to improve the ventilation of the fuel cell.

In this case, the gas exhaust causes aspiration of the air from the chamber 16 toward the exhaust duct 24 and therefore toward the outside of the aircraft, and thus this aspiration in turn causes intake of outside air into the chamber 16 through the duct 230.

Air movements have been shown in FIG. 1 such as:
ejection of gas from the turbine,
aspiration of air for cooling the cell, and
supply of air to the turbine.

Figure 2:
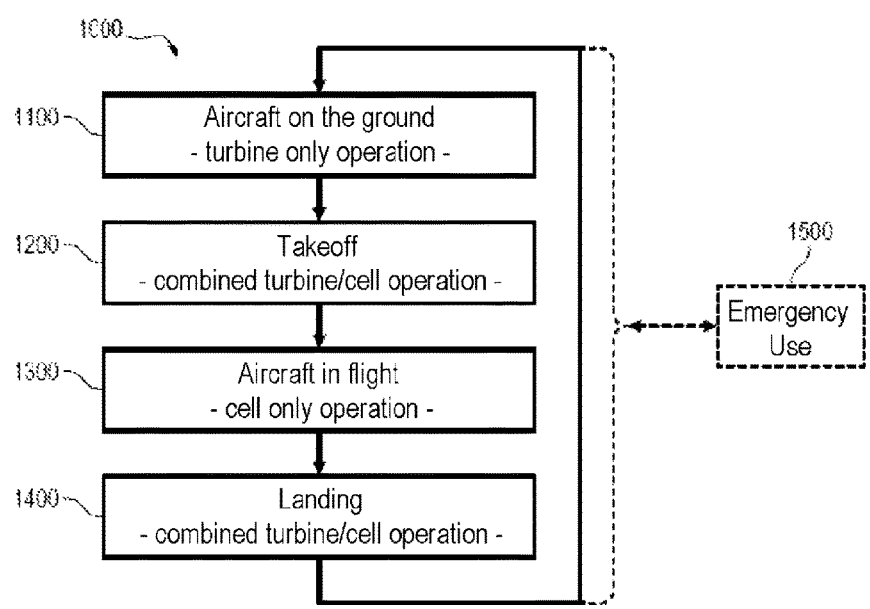
FIG. 2 shows the principal steps of a non-propulsive energy generating method.

With reference to FIG. 2, the principal steps of a method 1000 for generating non-propulsive energy in an aircraft are shown, implemented by means of the previously described system.

This method comprises the sequential use of the gas turbine and the fuel cell depending on the different phases of operation of the aircraft, and particularly a different utilization of the auxiliary power unit, depending on whether the aircraft is on the ground, in stabilized flight or in takeoff or landing phase.

During a ground operation phase 1100 of the aircraft, only the gas turbine is operating, to generate the non-propulsive energy needed for the operation of the accessory functions of the aircraft.

During this operation, if the weather is hot, for example when the temperature in the chamber is on the order of 80-100° C., the gas turbine makes it possible to cool, if necessary, the fuel cell by Venturi effect, as previously described, by having a constantly renewed flow of outside air circulating in the chamber.

If the weather is too cold for the operation of the cell, for example if the temperature is on the order of −40° C. or less, the operation of the gas turbine located in proximity to the cell, in the same chamber or in the rear cone of the aircraft, also makes it possible to heat the cell.

Once heated, if appropriate, during a takeoff phase 1200 of the aircraft, the fuel cell and the gas turbine are used simultaneously to produce the non-propulsive energy of the aircraft.

This allows the gas turbine to both contribute to the generation of non-propulsive energy and to effectively cool the fuel cell by Venturi effect. Indeed, absent operation of the turbine, in a takeoff phase where the aircraft is located at low altitudes in hot weather, it is possible for the temperature of the outside air to be too high to allow cooling of the cell by simply entry of air into the air intake channel 23.

On the other hand, once a stabilized flight phase 1300 is attained, the aircraft is located at a higher altitude where the air is colder, which allows to dispense with ventilation by Venturi effect, as cooling is carried out by intake of outside air.

Consequently, during this flight phase, the gas turbine is shut down and only the fuel cell is used to general non-propulsive energy.

Advantageously, but optionally, the gas turbine can be shut down before the aircraft has attained this stabilized flight phase, when thermodynamic conditions allow cooling of the cell by outside air intake (without the Venturi effect).

The conditions comprise:
- the speed of the aircraft, which directly impacts the flow of air into the air intake channel 23; by way of an example, at cruise speed the flow of outside air taken in is comprised between 3 and 6 kg/s, of which a major portion, for example on the order of 3 to 4 kg/s, circulates in the duct 231 for supplying the gas turbine,
- the temperature of the air outside the aircraft, and
- the temperature of the cell.

The method can therefore comprise measurement of the parameters described earlier and commanding transition between the combined operation of the turbine and the cell and operation of the cell alone when thermodynamic conditions allowing cooling of the cell without Venturi effect are attained.

Thus, as the gas turbine does not operate at altitude, it is not necessary to oversize it to ensure its proper operation over the entire flight.

Thus, the gas turbine and the fuel cell are each sized to supply sufficient electrical power for the operation of the accessories of the aircraft, i.e comprised between 50 and 500 kW, depending on the type and the size of the aircraft.

Finally, in the landing phase 1400, just as during the takeoff phase, the gas turbine is re-started to carry out a transition to ground-based operation and to ensure cooling of the cell if the outside temperature of the air is insufficient for cooling the cell.

Similarly to the transition between combined operation and operation of the cell alone, the instant at which the gas turbine is restarted is that wherein the thermodynamic conditions, comprising the speed of the aircraft, the temperature of the outside air, and the temperature of the cell, are insufficient to ensure cooling of the cell.

In this case, it may be preferable to establish a safety margin, and for example to re-start the turbine as soon as the aircraft begins a landing phase, or as soon as the outside air temperature increases.

Moreover, the proposed system also makes it possible to use the fuel cell intermittently during a failure phase of the gas turbine, for example a ground phase or a transitional phase (landing or takeoff), or to use the gas turbine to compensate for a failure of the fuel cell for limited flight altitudes. This emergency use of one of the two energy sources is shown by a step 1500 in the method.

The sequential coupling of the fuel cell and the gas turbine therefore makes it possible to dispense with a specific system dedicated to cooling or to heating of the fuel cell, and also makes it possible to avoid over-sizing the turbine.

The invention claimed is:

1. A system for generating non-propulsive energy in an aircraft, comprising:
    an auxiliary power unit comprising a gas turbine and a fuel cell,
    an intake channel for air from outside the aircraft, and
    an exhaust duct of the gas turbine,
    wherein the air intake channel comprises a cooling duct for the fuel cell, and said duct is in fluid communication with the exhaust duct of the gas turbine so that the ejection of gas coming from the gas turbine into the exhaust duct causes aspiration of air from outside the aircraft into the cooling duct by Venturi effect.

2. The system according to claim 1, further comprising a chamber wherein is installed the auxiliary power unit, the cooling duct leading into said chamber and the exhaust duct being in fluid communication with the chamber,
    the ejection of gas coming from the gas turbine into the exhaust duct causing aspiration of air from the chamber toward the outside of the aircraft through the exhaust duct by Venturi effect, said aspiration in turn causing aspiration of air from outside the aircraft into the chamber through the cooling duct.

3. The system according to claim 1, wherein the fuel cell is of the proton-exchange membrane cell or solid-oxide cell type.

4. The system according to claim 1, wherein the fuel cell is of the high temperature proton-exchange membrane cell type, the system being installed in an aircraft of the type comprising a pressurized cabin, the system further comprising an air supply system for the cell by extracting air from the pressurized cabin.

5. The system according to claim 1, wherein the fuel cell and the gas turbine are sized to supply a nominal power comprised between 50 and 500 kW.

6. An aircraft comprising a system according to claim 1.

7. A method for generating non-propulsive energy, implemented by a system for generating non-propulsive energy, in an aircraft, the system including:
    an auxiliary power unit comprising a gas turbine and a fuel cell,
    an intake channel for air from outside the aircraft, and
    an exhaust duct of the gas turbine,
    the air intake channel comprising a cooling duct for the fuel cell, and said duct is in fluid communication with the exhaust duct of the gas turbine so that the ejection of gas coming from the gas turbine into the exhaust duct causes aspiration of air from outside the aircraft into the cooling duct by Venturi effect,
    wherein the method comprises:
    generating non-propulsive energy by the gas turbine during a ground operating phase of the aircraft, and
    generating non-propulsive energy by the fuel cell during a stabilized flight operating phase of the aircraft.

8. The method for generating non-propulsive energy according to claim 7, further comprising combined generation of non-propulsive energy by the gas turbine and by the fuel cell during a takeoff and/or landing phase of the aircraft, the operation of the gas turbine causing cooling of the fuel cell by Venturi effect.

9. The method for generating non-propulsive energy according to claim 8, further comprising the detection of thermodynamic operating conditions of the aircraft comprising the speed of the aircraft, the temperature of the air outside the aircraft, and the temperature of the fuel cell, and the triggering of a transition, depending on said conditions, between a combined operating mode of the gas turbine and the fuel cell and an operating mode for the cell alone.

10. The method for generating non-propulsive energy according to claim 7, further comprising the operation respectively of the fuel cell or the gas turbine in the event of failure of the gas turbine or the fuel cell.

* * * * *